(12) United States Patent
Tiemann

(10) Patent No.: US 6,558,115 B2
(45) Date of Patent: May 6, 2003

(54) TURBINE GUIDE BLADE

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 20 days.

(21) Appl. No.: 09/795,095

(22) Filed: Feb. 28, 2001

(65) Prior Publication Data

US 2001/0018020 A1 Aug. 30, 2001

Related U.S. Application Data

(63) Continuation of application No. PCT/DE99/02595, filed on Aug. 18, 1999.

(30) Foreign Application Priority Data

Aug. 31, 1998 (DE) .......................................... 198 39 625

(51) Int. Cl.⁷ .............................................. F04D 29/38
(52) U.S. Cl. ...................... 415/115; 415/189; 415/191; 415/209.4
(58) Field of Search ................................. 415/115, 116, 415/189, 190, 191, 209.2, 209.3, 209.4, 208.1, 208.2

(56) References Cited

U.S. PATENT DOCUMENTS

| 5,135,354 A | | 8/1992 | Novotny | 415/115 |
| 5,332,360 A | * | 7/1994 | Correia et al. | 29/889.21 |
| 5,797,725 A | | 8/1998 | Rhodes | 415/209.2 |

FOREIGN PATENT DOCUMENTS

| DE | 2628807 | 1/1977 |
| EP | 0698723 A2 | 2/1996 |
| GB | 1516757 | 7/1978 |
| GB | 1605219 | 8/1984 |

* cited by examiner

Primary Examiner—Edward K. Look
Assistant Examiner—Dwayne J. White
(74) Attorney, Agent, or Firm—Laurence A. Greenberg; Werner H. Stemer; Ralph E. Locher

(57) ABSTRACT

A turbine guide blade includes a platform which absorbs thermal loads and a fastening region adjoining the platform for absorbing mechanical loads. The fastening region has such a slim construction that it leaves a cold side of the platform readily accessible.

15 Claims, 3 Drawing Sheets

TURBINE GUIDE BLADE

CROSS-REFERENCE TO RELATED APPLICATION

This application is a continuation of copending International Application No. PCT/DE99/02595, filed Aug. 18, 1999, which designated the United States.

BACKGROUND OF THE INVENTION

Field of the Invention

The invention relates to a turbine guide blade which is directed along an axis and has a blade profile, a platform and a fastening region.

German Published, Non-Prosecuted Patent Application DE 26 28 807 A1 discloses an impingement-cooling system for a gas-turbine blade. The gas-turbine blade is directed along a blade axis and has a blade body and a platform region along the blade axis. A platform extends in the platform region, transversely to the blade axis, radially outwardly away from the blade body. Such a platform forms part of a flow duct for a working fluid that flows through a gas turbine in which the turbine blade is fitted. Very high temperatures occur in that flow duct in a gas turbine. As a result, that surface of the platform which is exposed to the hot gas is subjected to high thermal loading.

In order to cool the platform, a perforated wall element is disposed in front of that side of the platform which faces away from the hot gas. Cooling air enters through the holes in the wall element and strikes that side of the platform which faces away from the hot gas. Efficient impingement cooling is thus achieved.

A guide-blade segment having closed-circuit steam cooling is described in European Patent Application EP 0 698 723 A2, corresponding to U.S. Pat. Nos. 5,634,766; 5,591,002; and 5,743,708. The guide-blade segment has a platform region which serves to define a hot-gas duct of a gas turbine. The platform region has an outflow-side hook with which it is connected to a casing of a steam turbine in such a way as to absorb loads. The platform region serves both as a hot-gas screen and to absorb loads.

A turbine blade disclosed in UK Patent 1 516 757, corresponding to U.S. Pat. Nos. 4,012,167 and 4,017,213, is constructed in a similar manner. There too, a cooled platform region acts through an outflow-side hook connecting it to the casing of a gas turbine to assume the functions of both absorbing loads and providing the hot-gas screen.

SUMMARY OF THE INVENTION

It is accordingly an object of the invention to provide a turbine guide blade, which overcomes the hereinafore-mentioned disadvantages of the heretofore-known devices of this general type and which can be cooled in a simple and efficient manner.

With the foregoing and other objects in view there is provided, in accordance with the invention, a turbine guide blade, comprising a guide blade axis. A blade profile is disposed along the axis and has a profile contour. A platform follows the blade profile along the axis. The platform has a hot-gas side for defining a hot-gas duct of a turbine and a cold side opposite the hot-gas side. A fastening region follows the platform along the axis, for absorbing most mechanical loads caused by a working medium flowing around the blade profile. The platform has to absorb at most a small portion of the mechanical loads. The fastening region, in a projected view along the axis in a direction from the fastening region toward the blade profile, covers less than three quarters of the cold side.

Such a turbine guide blade has a functional separation for thermal loads on one hand and mechanical loads on the other hand. The thermal loads are absorbed in front of the fastening region largely by the platform. The platform screens a working medium flowing around the blade profile from the fastening region and forms part of a flow duct of a turbine in which the turbine blade is fitted. The platform has a comparatively thin construction, so that it can be cooled in an efficient manner. Such a thin construction is made possible due to the fact that most of the mechanical loads which act on the turbine blade due to the working fluid are absorbed by the fastening part. The turbine guide blade can be fastened in a turbine housing through the fastening part. The force acting on the blade profile and being exerted by the working fluid is transmitted to the turbine casing through the fastening part. The platform must therefore absorb at most a small proportion of those forces and can therefore have a comparatively thin construction. The accessibility of the cold side of the platform may be restricted by the fastening part, e.g. when the fastening part has a platform-like construction. The invention removes that disadvantage by providing a slim construction of the fastening part. Thus the fastening part only partly covers the cold side. The cold side is therefore still readily accessible, e.g. for the fitting of an impingement-cooling plate.

In accordance with another feature of the invention, the fastening region includes a core which is connected to the cold side and has a core contour running in the same direction as the profile contour; and a planar web which extends along the axis and serves for fastening in a turbine casing.

In accordance with a further feature of the invention, the core is connected to the web through a stiffening connecting region.

In accordance with an added feature of the invention, a vertical rib preferably connects the core and the web in a stiffening manner along the axis. A horizontal rib preferably connects the core and the web in a stiffening manner perpendicularly to the axis. Furthermore, four vertical ribs and/or four horizontal ribs are preferably provided.

Projections or hooks, for example, with which the turbine guide blade is hooked in the turbine casing, are disposed on the web. A robust and yet slim construction of the fastening region is achieved by the construction of the fastening region with a core and a stiffening connection between the core and the web. In particular, the fastening region obtains stiffness which is sufficient for the use of the turbine guide blade, by ribbing through the use of the vertical and/or horizontal ribs.

In accordance with an additional feature of the invention, the vertical rib or ribs and/or the horizontal rib or ribs are formed in one piece with the core and with the web.

In accordance with yet another feature of the invention, the turbine guide blade is preferably cast and in fact preferably directionally solidified or single-crystalline.

In accordance with yet a further feature of the invention, the turbine guide blade has an impingement-cooling plate which is disposed in front of the cold side and in turn has a multiplicity of openings directed toward the cold side. With such an impingement-cooling plate, cooling fluid is directed through the openings perpendicularly onto the cold side. The platform is cooled in an especially efficient manner by such impingement cooling. The impingement-cooling plate can be fitted in a very simple manner due to the easy accessibility of the cold side. In addition, the easy accessibility of the cold side also permits the fitting of a more complex impingement-cooling system.

In accordance with a concomitant feature of the invention, the turbine guide blade is constructed as a gas-turbine guide blade. In particular in a stationary gas turbine, very high temperatures for the gas flowing through the gas turbine are achieved. There is thus a need for very efficient cooling of the platform of a gas-turbine guide blade. Very effective cooling is achieved with the concept of a comparatively thin platform which is readily accessible from the cold side, since the production of the gas-turbine guide blade at the same time turns out to be very simple.

Other features which are considered as characteristic for the invention are set forth in the appended claims.

Although the invention is illustrated and described herein as embodied in a turbine guide blade, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
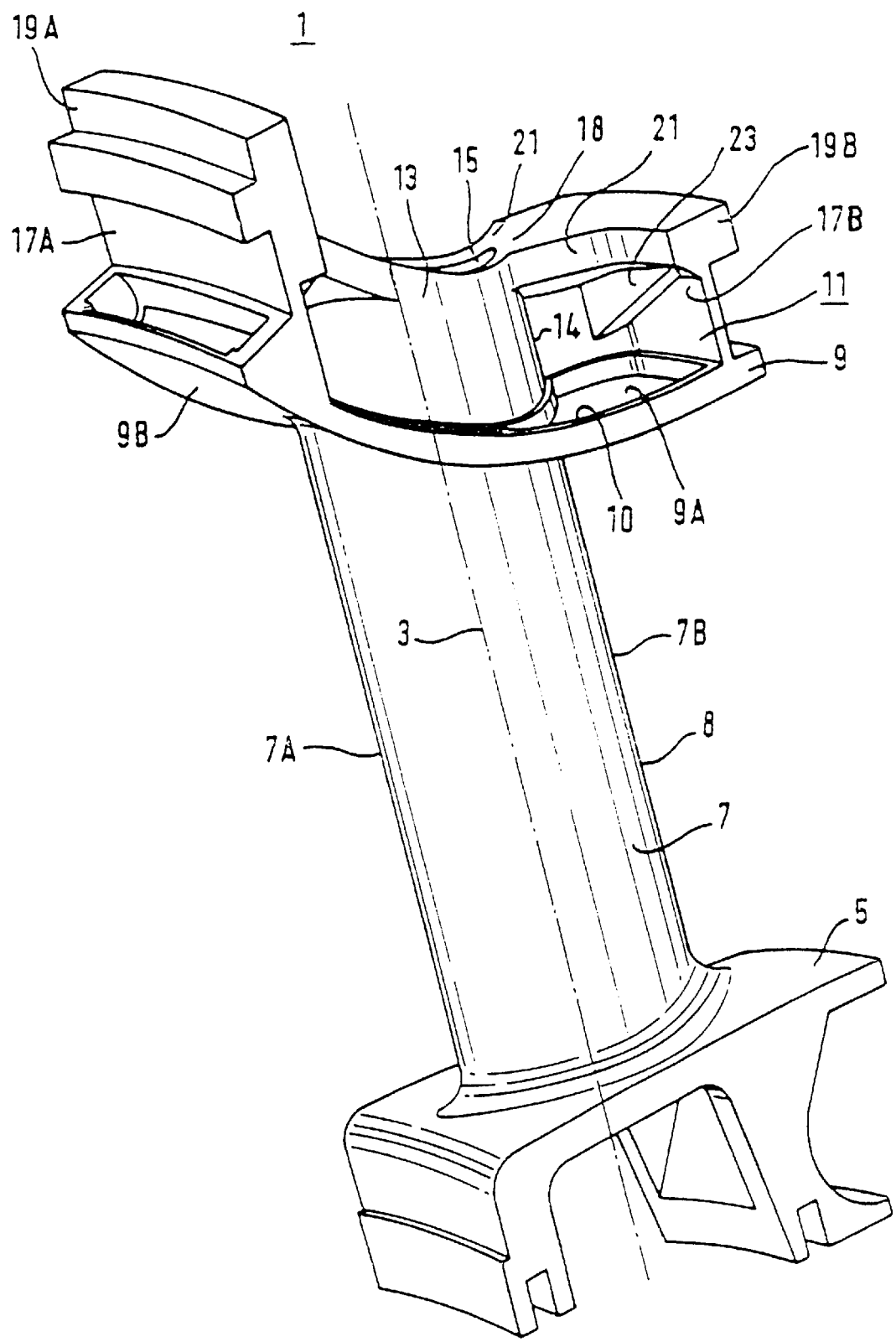
FIG. 1 is a diagrammatic, perspective view of a gas-turbine guide blade as seen from a first direction of view.

Referring now in detail to the figures of the drawings, in which the same reference numerals have the same meaning, and first, particularly, to FIG. 1 thereof, there is seen a gas-turbine guide blade 1. A head region 5, a blade profile 7 with a profile contour 8, a platform 9 and a fastening region 11 extend along an axis 3. The head region 5 serves to define and seal a non-illustrated hot-gas duct of a gas turbine on the shaft side. The gas-turbine guide blade 1 can be fitted in the gas turbine. In the fitted state, the blade profile 7 is disposed in the hot-gas duct. The platform 9 serves to define and seal the hot-gas duct on the casing side. The platform 9 has a hot-gas side 9B directed toward the blade profile 7 and a cold side 9A opposite the hot-gas side 9b. The platform 9 is stiffened by an encircling strut 10. The fastening region 11 serves to fasten the gas-turbine guide blade 1 in a turbine casing. The fastening region 11 includes a core 13 with a core contour 14. The core 13 is disposed on the cold side 9A and the core contour 14 thereof geometrically constitutes an extension of the blade profile 7. A cavity 15 passes through the core 13 as well as through the blade profile 7. Cooling air for cooling the gas-turbine guide blade 1 can be directed into this cavity 15.

Two planar webs 17A, 17B directed along the axis 3 are disposed on the cold side 9A. In particular, an incident-flow-side web 17A is disposed on the side of a leading edge 7A of the blade profile 7. An outflow-side web 17B is disposed on the side of a trailing edge 7B of the blade profile 7. The core 13 lies between the webs 17A, 17B. The incident-flow-side web 17A has an L-shaped projection 19A at its end. The outflow-side web 17B has a parallelepiped-shaped projection 19B at its end. The gas-turbine guide blade 1 is hooked in a turbine casing through the use of the projections 19A, 19B. The core 13 is connected to the webs 17A and 17B in a connecting region 18 in a stiffening and rounded-off manner. Four horizontal ribs 21 which stiffen the fastening region 11 perpendicularly to the axis 3, are also provided. Two respective horizontal ribs 21 are disposed between each web 17A and 17B and the core 13. In addition, four vertical ribs 23 are provided between the platform 9 and the horizontal ribs 21, specifically one vertical rib 23 for each horizontal rib 21. These vertical ribs 23 connect the core 13 to the webs 17A, 17B in a stiffening manner. Therefore, stiffening along the axis 3 is obtained.

Figure 3:
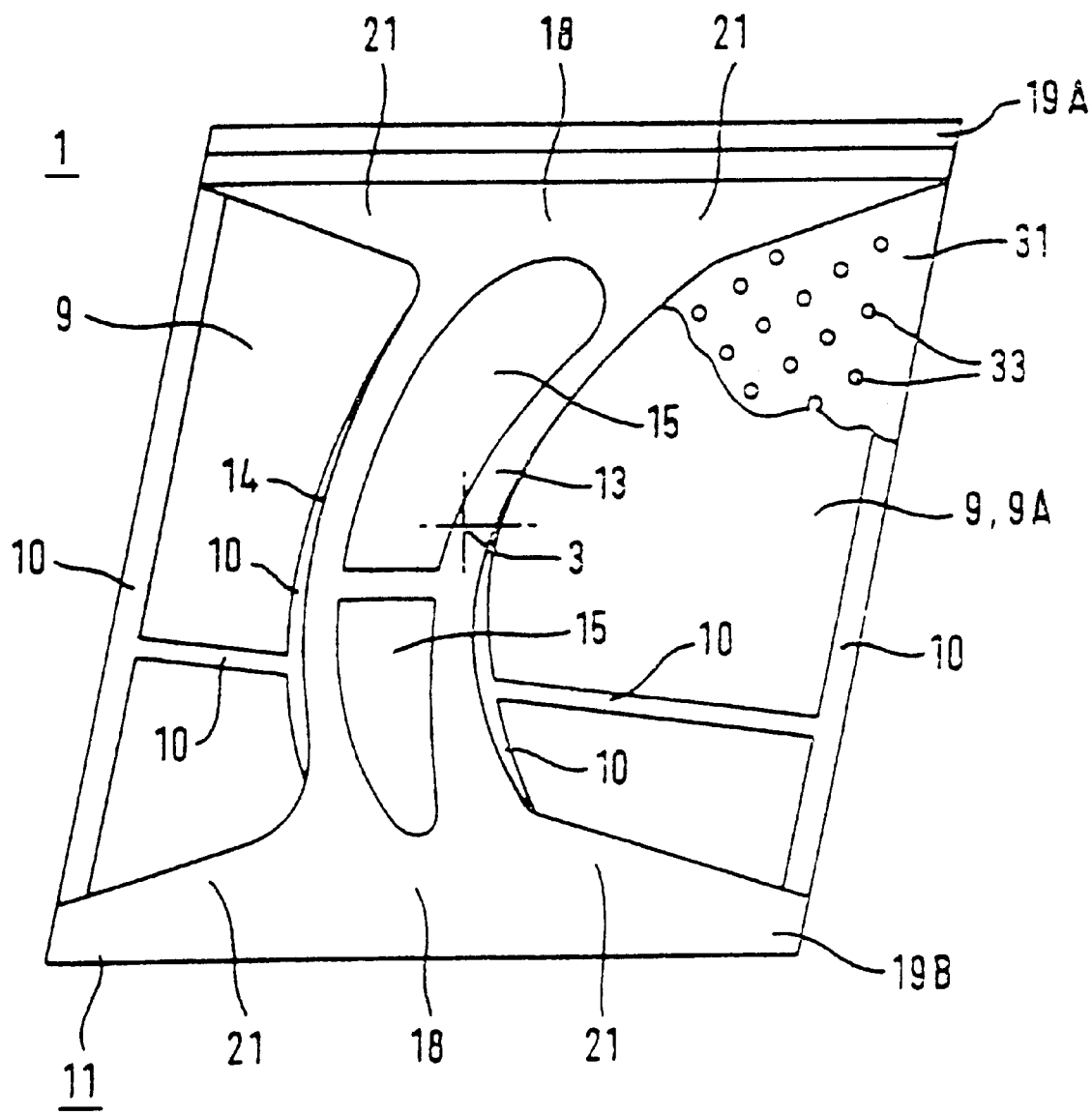
FIG. 3 is a plan view of a fastening region of a gas-turbine guide blade.

Due to this construction of the fastening region 11 with the core 13, the webs 17A, 17B and the horizontal and vertical ribs 21, 23, a very robust configuration of the fastening region 11 is obtained. At the same time, however, the fastening region 11 only partly covers the cold side 9A, as is seen in FIG. 3. As a result, the cold side 9A is still readily accessible. In this way, structural measures for cooling the platform 9 can be taken in a simple manner, from the production point of view. In particular, an impingement-cooling plate seen in FIG. 3 can be attached in front of the cold side 9A in a simple manner. Furthermore, a considerable saving in weight is obtained for the turbine guide blade, a factor which is of particular interest for an aircraft engine.

Figure 2:
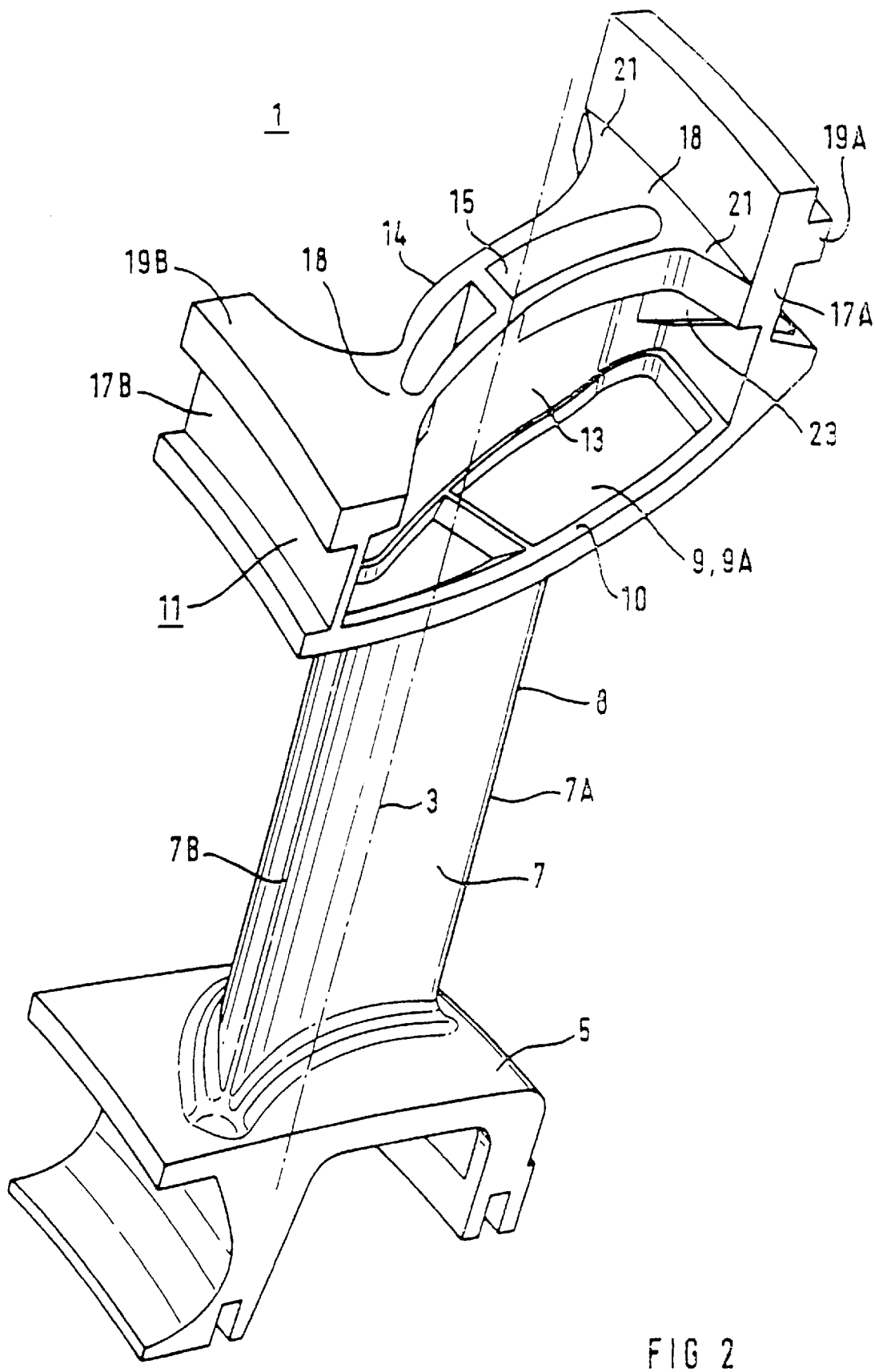
FIG. 2 is a perspective view of the gas-turbine blade of FIG. 1 as seen from a second direction of view.

FIG. 2 shows the gas-turbine guide blade 1 of FIG. 1 in a direction of view facing toward the trailing edge 7B. The vertical ribbing on the incident-flow side of the fastening region 11 can be seen in this direction of view. This vertical ribbing corresponds to the outflow-side vertical ribbing provided by the vertical ribs 23.

FIG. 3 shows a projected view of the gas-turbine guide blade 1 of FIG. 1 along the axis 3 in the direction from the fastening part 11 toward the blade profile 7. It becomes clear in this view that the fastening region 11 only partly covers the cold side 9A. Preferably, more than one quarter of the cold side 9A remains visible, i.e. readily accessible. Preferably, more than 60% of the region of the cold side 9A without the portion of the core 13 remains visible. An impingement-cooling plate 31 is disposed in front of the cold side 9A. A number of openings 33 are made in this impingement-cooling plate 31. Cooling air passes through these openings 33 perpendicularly onto the cold side 9A. As a result, the cold side 9A is efficiently cooled by impingement cooling. The mounting of the impingement-cooling plate 31 or of another, possibly more complex, cooling configuration turns out to be very simple due to the easy accessibility of the cold side 9A.

I claim:

1. A turbine guide blade, comprising:
   a guide blade axis;
   a blade profile disposed along said axis, said blade profile having a profile contour;
   a platform following said blade profile axially along said axis and disposed transversely of said axis, said platform having a hot-gas side for defining a hot-gas duct of a turbine and a cold side opposite said hot-gas side;
   a fastening region following said platform axially along said axis and disposed transversely of said axis, for absorbing most mechanical loads caused by a working medium flowing around said blade profile;
   said platform having to absorb at most a small portion of the mechanical loads;

said fastening region, in a projected view along said axis in a direction from said fastening region toward said blade profile, covering less than three quarters of said cold side, said fastening region having a core connected to said cold side, said core having a core contour extending co-directionally with said profile contour, and said fastening region further having a planar web extended along said axis, for fastening in a turbine casing; and a horizontal rib interconnecting said core and said planar web, said horizontal rib extending from said core to said planar web in a continuous widening manner and providing a stiffening connection substantially perpendicularly to said axis.

2. The turbine guide blade according to claim 1, including a stiffening connecting region connecting said core to said web.

3. The turbine guide blade according to claim 1, wherein said horizontal rib is formed in one piece with said core and with said web.

4. The turbine guide blade according to claim 1, wherein said blade profile, said platform and said fastening region are cast.

5. The turbine guide blade according to claim 1, wherein said blade profile, said platform and said fastening region have a single-crystalline construction.

6. The turbine guide blade according to claim 1, wherein said blade profile, said platform and said fastening region are directionally solidified.

7. The turbine guide blade according to claim 1, including an impingement-cooling plate disposed in front of said cold side and having a multiplicity of openings directed toward said cold side.

8. The turbine guide blade according to claim 1, including a vertical rib interconnecting said core and said web in a stiffening manner along said axis.

9. The turbine guide blade according to claim 8, wherein said vertical rib is formed in one piece with said core and with said web.

10. The turbine guide blade according to claim 8, wherein said vertical rib is one of four vertical ribs.

11. The turbine guide blade according to claim 10, wherein said vertical ribs are formed in one piece with said core and with said web.

12. The turbine guide blade according to claim 1, wherein said horizontal rib is one of four horizontal ribs.

13. The turbine guide blade according to claim 12, wherein said horizontal ribs are formed in one piece with said core and with said web.

14. A gas turbine guide blade, comprising:

a guide blade axis;

a blade profile disposed along said axis, said blade profile having a profile contour;

a platform following said blade profile axially along said axis and disposed transversely of said axis, said platform having a hot-gas side for defining a hot-gas duct of a turbine and a cold side opposite said hot-gas side;

a fastening region following said platform axially along said axis and disposed transversely of said axis, for absorbing most mechanical loads caused by a working medium flowing around said blade profile;

said platform having to absorb at most a small portion of the mechanical loads;

said fastening region, in a projected view along said axis in a direction from said fastening region toward said blade profile, covering less than three quarters of said cold side, said fastening region having a core connected to said cold side, said core having a core contour extending co-directionally with said profile contour, and said fastening region further having a planar web extending along said axis, for fastening in a turbine casing; and a horizontal rib interconnecting said core and said planar web, said horizontal rib extending from said core to said planar web in a continuous widening manner and providing a stiffening connection substantially perpendicularly to said axis.

15. A stationary gas turbine guide blade, comprising:

a guide blade axis;

a blade profile disposed along said axis, said blade profile having a profile contour;

a platform following said blade profile axially along said axis and disposed transversely of said axis, said platform having a hot-gas side for defining a hot-gas duct of a turbine and a cold side opposite said hot-gas side;

a fastening region following said platform axially along said axis and disposed transversely of said axis, for absorbing most mechanical loads caused by a working medium flowing around said blade profile;

said platform having to absorb at most a small portion of the mechanical loads;

said fastening region, in a projected view along said axis in a direction from said fastening region toward said blade profile, covering less than three quarters of said cold side, said fastening region having a core connected to said cold side, said core having a core contour extended co-directionally with said profile contour, and said fastening region having a planar web extending along said axis, for fastening in a turbine casing; and a horizontal rib interconnecting said core and said planar web, said horizontal rib extending from said core to said planar web in a continuous widening manner and providing a stiffening connection substantially perpendicularly to said axis.

* * * * *